United States Patent
Baechtle et al.

(10) Patent No.: US 8,137,167 B2
(45) Date of Patent: Mar. 20, 2012

(54) DEVICE FOR FILLING CASINGS

(75) Inventors: Manfred Baechtle, Schemmerhofen (DE); Juergen Rechsteiner, Eberhardzell (DE); Christian Restle, Birkenhard (DE); Michael Hammerer, Laupheim (DE)

(73) Assignee: Albert Handtmann Maschinenfabrik GmbH & Co. KG, Biberach (DE)

( * ) Notice: Subject to any disclaimer, the term of this patent is extended or adjusted under 35 U.S.C. 154(b) by 58 days.

(21) Appl. No.: 12/820,424

(22) Filed: Jun. 22, 2010

(65) Prior Publication Data

US 2010/0330891 A1 Dec. 30, 2010

(30) Foreign Application Priority Data

Jun. 24, 2009 (EP) .................................... 09008276

(51) Int. Cl.
*A22C 11/00* (2006.01)
(52) U.S. Cl. ........................................................ 452/36
(58) Field of Classification Search .............. 452/21–23, 452/30–32, 35, 36, 46–48, 51
See application file for complete search history.

(56) References Cited

U.S. PATENT DOCUMENTS

| | | | | |
|---|---|---|---|---|
| 4,142,273 A | * | 3/1979 | Gay | ................................ 452/46 |
| 4,438,545 A | | 3/1984 | Kupcikevicius et al. | |
| RE32,315 E | * | 12/1986 | Kollross | ............................ 452/22 |
| 4,625,362 A | * | 12/1986 | Kollross et al. | .................. 452/22 |
| 4,642,848 A | * | 2/1987 | Kollross | ............................ 452/22 |
| 4,893,377 A | | 1/1990 | Evans et al. | |
| 4,901,505 A | | 2/1990 | Williams, Jr. | |
| 7,666,071 B2 | * | 2/2010 | Nakamura et al. | ............... 452/36 |
| 7,771,254 B2 | * | 8/2010 | Nunn | ............................... 452/30 |

FOREIGN PATENT DOCUMENTS

DE 10 2007 025 583 A1 1/2008
WO WO-90/03114 A2 4/1990

OTHER PUBLICATIONS

European Search Report for 09003276.9, dated Oct. 27, 2009.
Vemag, LPG 208, Jun. 17, 2010.

* cited by examiner

*Primary Examiner* — Richard Price, Jr.
(74) *Attorney, Agent, or Firm* — Marshall, Gerstein & Borun LLP

(57) ABSTRACT

A device for filling casings, having a twist-off head which comprises circumferentially offset filling tubes and which is arranged on a support panel to be displaceable in axially parallel fashion and to be rotatable, and a rotatingly drivable casing brake which is axially aligned with a filling tube located in the filling position, the casing brake and the support panel being connected via a rigid shaft which comprises a support section extending towards the casing brake and a guide section extending centrally through the twist-off head, with a drive train being arranged in said shaft.

20 Claims, 4 Drawing Sheets ion that is about 15% to 25% the outer diameter of the
DEVICE FOR FILLING CASINGS The present application claims the benefit of priority to European Patent No. 09008276.9, filed Jun. 24, 2009.

FIELD OF THE DISCLOSURE

The present disclosure relates to a device of the type used for filling casings, such as in sausage production operations.

BACKGROUND

In sausage production, above all in the processing of natural casings, the time needed for threading or stringing the casings onto a filling tube constitutes a factor that considerably decreases the output. The use of a twist-off head with a plurality of filling tubes is therefore known (U.S. Pat. No. 4,901,505 A and DE 10 2007 025 583 A), so that it is still possible to fill a casing with one filling tube while a new casing is strung or spooled onto another filling tube. At least the filling tube located in the filling position and, if necessary, also the casing brake may be rotatingly drivable, inter alia, for portioning purposes. In the known devices the casing brake is moved away from the filling tube end for changing the casing, which requires that in this region a corresponding clearance has to be provided where chains or belts, or the like, which are per se provided for transportation, must be removed or displaced. This is disadvantageous and time-consuming because one must e.g. wait until portions still positioned on the belts or chains are transported away. The filling operation is interrupted only temporarily for rotating the new filling tube into the filling position and the used filling tube into the stringing or spooling position. The filling position will then be resumed immediately while the new casing is being spooled on and/or the used filling tube is exchanged. As a result, the device shows a positive performance record.

Furthermore, a device is known in practice (Vemag LPG 208, homepage of the company Vemag), in the case of which during change of the casing the casing brake remains stationary, whereas the twist-off head is shifted towards the filling machine. The filling tube located in the filling position is linearly moved out of the casing brake and is then pivoted by rotating the twist-off head into a stringing position. The twist-off head is subsequently moved forwards again towards the casing brake. At least two linear guides are needed that are mechanically complicated for the reason that they are telescopic, and also one additional supply telescope between the casing brake and a housing surrounding the twist-off head. Said components increase the maintenance and cleaning efforts and the overall weight of the device.

SUMMARY OF THE DISCLOSURE

It is the object of the present disclosure to indicate a device of the last-mentioned type that is of a constructionally simpler design and in the case of which both the filing tube located in the filling position and the filling tube located in the threading position can be accessed without any obstacles over a large area and are freely visible.

Only the one rigid shaft that constructionally simplifies the device and nevertheless satisfies several demands is used for the twist-off head, which is optionally placed in a free-standing way. The shaft establishes a stable connection between the casing brake and the support panel, forms the rotational axis of the twist-off head, guides the twist-off head in its axial shift movements and rotational movements and stabilizes the twist-off head during the filling operation and the process for changing the casing. In addition the drive train is shielded and accommodated in the shaft in a space-saving way. Free access over a large area and an unobstructed view with respect to the filling tubes and the casing brake are given from an operating side of the device.

In an expedient embodiment, the drive train is driven at least for rotating the filling tube located in the filling position in the shaft either from the side of the casing brake or from the side of the support panel, depending on where in the device the access is better for driving the drive train. The drive train, however, can preferably also be used for driving the casing brake and/or for rotating the twist-off head and will then assume a multifunction.

In a constructionally simple embodiment the support section and the guide section are coaxial with each other. Nevertheless, access and vision are hardly obstructed.

In a different embodiment the shaft between the support section and the guide section comprises a crank, the support section being here positioned to be offset relative to the guide section, preferably and substantially towards the casing brake. Hence, owing to the crank the support section is laterally offset relative to the filling tube located in the filling position, relative to the casing brake and relative to the filling tube located in the stringing position, which improves operability from an operating side of the device.

In a different embodiment, a power train is provided in, on or at a housing which contains the casing brake and is connected to the support section, and at least the support section of the shaft is made hollow, and the drive train that can be operated by the power train is arranged to extend in the support section to the twist-off head and is there coupled or adapted to be coupled at least with the filling tube located in the filling position, where preferably the casing brake in the stationary housing is also rotatingly drivable by the power train or the drive train. As a result the space occupied by the support section between the casing brake and the twist-off head is exploited for accommodating the drive train, thereby further simplifying the construction, with the support section protecting the drive train against dirt.

The casing brake can be rotatingly driven directly in the housing that is exchangeably accommodating the casing brake. Expediently, however, at least the filling tube located in the filling position and also the casing brake are rotatingly driven by the same power train or drive train, which offers the advantage that less drive components are needed that fulfill several functions.

It is advantageous when the support section and the guide section are arranged in parallel with each other, and the support section is offset relative to an imaginary extension of the twist-off head axis to the side of the casing brake by a dimension that is about 15% to 25% the outer diameter of the twist-off head or slightly less than the distance of each filling tube from the twist-off head axis. This provides easy access to the filling tube located in the filling position and to the casing brake, and the filling tube located in the stringing position is also exposed for spooling the casing without the shaft presenting any obstacle. The guide section around which the twist-off head is rotatable extends only within a region that is needed for shifting the twist-off head and, despite its position that is central relative to the twist-off head, it neither presents an obstacle during the filling operation nor during an operation for changing the casing as these operations take place closer at or from the region of the casing brake. The support section should here be positioned within the movement paths of the filling tubes upon rotation of the twist-off head so as to avoid collisions, also if too much casing material has been spooled.

Expediently, the guide section and the support section are round tubes, but the guide section could even be a solid round profile.

In an expedient solution for driving at least the filling tube located in the filling position, the drive train towards the filling tube comprises a coupling which can be engaged and disengaged by shifting the twist-off head. When the twist-off head is pushed away from the casing brake so as to rotate a new filling tube into the filling position, the coupling is automatically disengaged, whereas the fitting coupling is again engaged when a rotary drive of the filling tube is needed for the filling operation. The disengageable coupling also considerably simplifies the device in its design.

In a specific embodiment the drive train comprises a drive shaft positioned in the support section, the drive shaft exiting on the crank out of the support section and being adapted to be aligned with an exit end relative to a rotary coupling arranged in the twist-off head. The exit end is aligned by rotating the twist-off head relative to the rotary coupling and is engaged or disengaged by shifting the twist-off head. Expediently, the rotary coupling is an arc groove coupling, and the exit end of the drive shaft is configured to fit the arc groove coupling.

Since different filling modes are possible in the device and since the twist-off head has to assume different positions for said modes, e.g. a normal filling position or a displacement type filling position, the exit end of the drive shaft is axially adjustable on the drive shaft in an expedient embodiment and is adapted to be fixed in the support section in different shift positions. To this end an adjusting device with an adjusting handle for axially adjusting the exit end of the drive shaft may be provided on the support section, e.g. in the manner of a splined arrangement. This permits an easy adaptation of the drive train to the respective filling mode.

In a different embodiment the coupling may be provided in the twist-off head between the exit end of the drive shaft, which is relatively displaceable in the twist-off head, with the drive shaft possibly carrying a gear at said place, and the respective filling-tube rotary bearing, which is internally arranged in the twist-off head. In this instance a single coupling sleeve, which is e.g. stationarily positioned in the guide section, suffices, the coupling sleeve being in drive communication with the exit end of the drive shaft, and upon rotation of the twist-off head the respective filling-tube rotary bearing is rotated towards the coupling sleeve.

In an expedient embodiment a simple drive concept is created in that in the drive train an output shaft leads into the housing in which the casing brake is supported to be exchangeable and rotatable, wherein the output shaft is e.g. coupled or adapted to be coupled via a belt drive with the casing brake and the drive train.

Expediently, the crank of the shaft is placed such that it approximately defines the maximum displacement stroke of the twist-off head away from the support panel.

In the device, the housing and the support panel are expediently arranged to be stationary on a base which may accommodate control and/or drive systems, the base being either movable towards the associated filling machine or adapted to be docked thereto, or the filling machine and the base are united in a different way.

In a further embodiment, the twist-off head is displaced by means of a servo drive, preferably via at least one screw spindle, in axially parallel fashion on the guide section of the shaft.

The screw spindle, preferably a pair of screw spindles, may be arranged to be offset relative to the guide section between the support panel and the twist-off head and may be rotatable with the twist-off head around the guide section. Servo drives for displacing and/or rotating the twist-off head could be arranged either in the area of the support panel or in the base.

The screw spindle may be installed in another embodiment also directly in the guide section of the shaft so as to further simplify the device. This is above all expedient when the drive train in the shaft is also used for rotating the twist-off head.

In a particularly expedient embodiment, the twist-off head is rotated by means of the drive train around the guide section via a coupling which is arranged in the twist-off head and which can be engaged and disengaged between a work position and a rotary position by shifting the twist-off head on the guide section. The rotation of the twist-off head for positioning a different filling tube in the filling position is carried out in the rotary position of the twist-off head in which the coupling between the drive train and the filling-tube rotary bearing is disengaged and only the coupling between the drive train and the twist-off head is engaged. By contrast, in the work position the coupling between the drive train and the filling-tube rotary bearing is engaged, while the other coupling between the drive train and the twist-off head is then disengaged.

In a further embodiment, the support panel and the twist-off head have arranged thereinbetween a supply tube which is connected to the supply means and which is in parallel with the twist-off head axis and displaceable in the support panel and which via a rotary connection provided on the twist-off head is connectable to the filling tube located in the filling position. The arrangement of the supply tube does not present an obstacle to the shift movements of the twist-off head. The rotary connection permits a simple filling connection between the supply means and the filling tube via the supply tube. Said rotary connection may be designed in a form resembling a slide ring. The twist-off head is here rotating relative to the supply tube and the rotary connection.

BRIEF DESCRIPTION OF THE DRAWINGS

Embodiments of the subject matter of the disclosure shall now be explained with reference to the drawings, in which.

DETAILED DESCRIPTION

Figure 1:
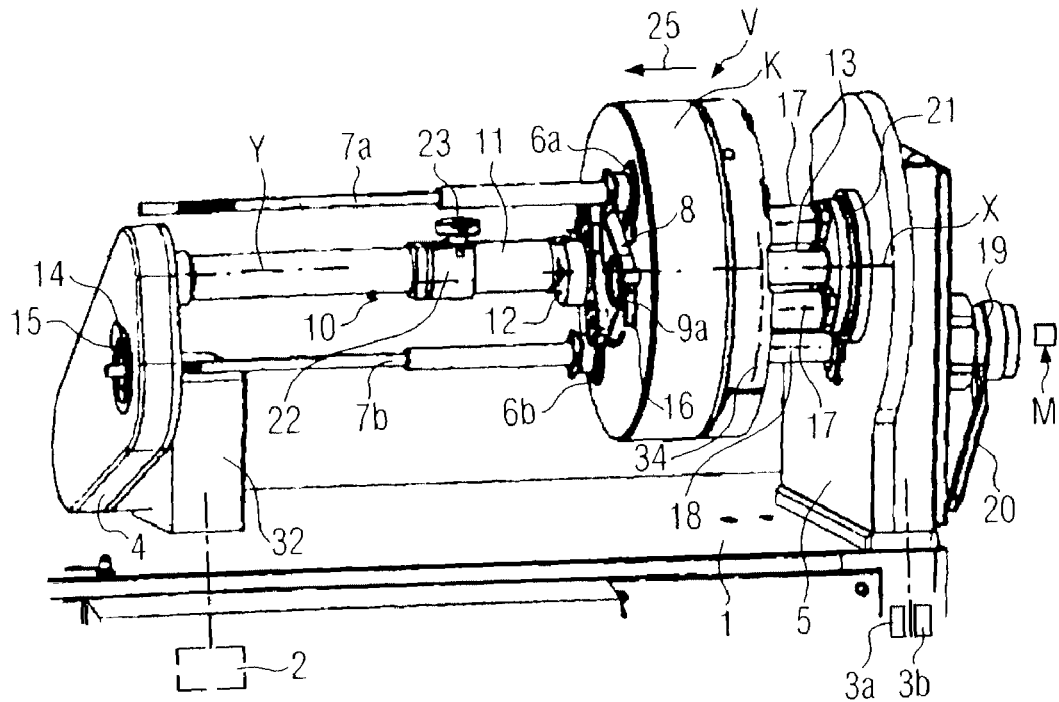
FIG. 1 is a perspective view taken in a viewing direction from an operating side of
  i. a device for filling casings, in a work position.

A device V that is illustrated in FIGS. 1 to 4 only with basic components and is used for filling casings, e.g. in sausage production, comprises a base 1 which is functionally assigned to a filling machine M and which can e.g. accommodate drive systems 2, 3a, 3b for a casing brake 15 and/or at least one filling tube 7a, 7b and/or a rotating means of a twist-off head K and/or an axial shifting means of the twist-off head K.

A housing 4 with a box-shaped base plate 32 is stationarily fixed on the base 1. A casing brake 15 is held in the housing 4 in an opening 14 to be expediently exchangeable. A support panel 5 is positioned on the base 1 at a distance from the housing 4. The housing 4 containing the casing brake 15 and the support panel 5 are fixedly interconnected by means of a single rigid shaft 10, which has a crank 12 and is subdivided by the crank 12 into a support section 11 and a guide section 13 (e.g. round tubes). The support section 11 is connected to the housing 4 and substantially terminates on the crank 12. The guide section 13 extends from the crank 12 to the support panel 5 and is fixed at said place. The guide section 13 defines a rotational axis X of the twist-off head K and guides and supports the twist-off head K in its shift movements between e.g. the filling position in FIG. 1 and an intermediate position in FIG. 2, which is closer to the support panel 5. The housing 4, the support panel 5, the base 1 and the shaft 10 form a stable frame structure. The support section 11 is (FIG. 3) offset relative to the twist-off head axis (X) in horizontal direction with a dimension (e) that may e.g. be between 15% and 25% the outer diameter (d) of the twist-off head (K) or is slightly shorter than the radial distance of each of the filling tubes 7a, 7b from the twist-off head axis X, which filling tubes 7a, 7b are arranged in the illustrated embodiment to be diametrically opposite to each other on the twist-off head K and are provided for filling and holding a strung or spooled casing section (not shown). The support section 11 therefore defines a support axis Y that is laterally offset relative to the twist-off head axis X.

On the twist-off head K, for instance, two diametrically opposite filling-tube rotary bearings 6a, 6b are arranged at the front side. A filling tube 7a, 7b is exchangeably mounted in each filling-tube rotary bearing 6a, 6b. Furthermore, the front side of the twist-off head K has mounted thereon a plate 8 in which two rotary couplings 9a, 9b, which are diametrically opposite relative to the twist-off head axis X, are arranged to be offset relative to the filling-tube rotary bearings 6a, 6b. The rotary couplings 9a, 9b (FIG. 3) exhibit smaller, but identical, radial distances from the twist-off head rotary axis X than the filling-tube rotary bearings 6a, 6b and are e.g. open arc-groove type rotary couplings that are each connected to a filling-tube rotary bearing 6a, 6b via a drive connection 31, which is outlined in FIG. 3.

Lock levers 16 which permit a blocking of the twist-off head K and/or of any drive connections in specific operating situations may optionally be provided on the front side of the twist-off head K (revolver).

Figure 2:
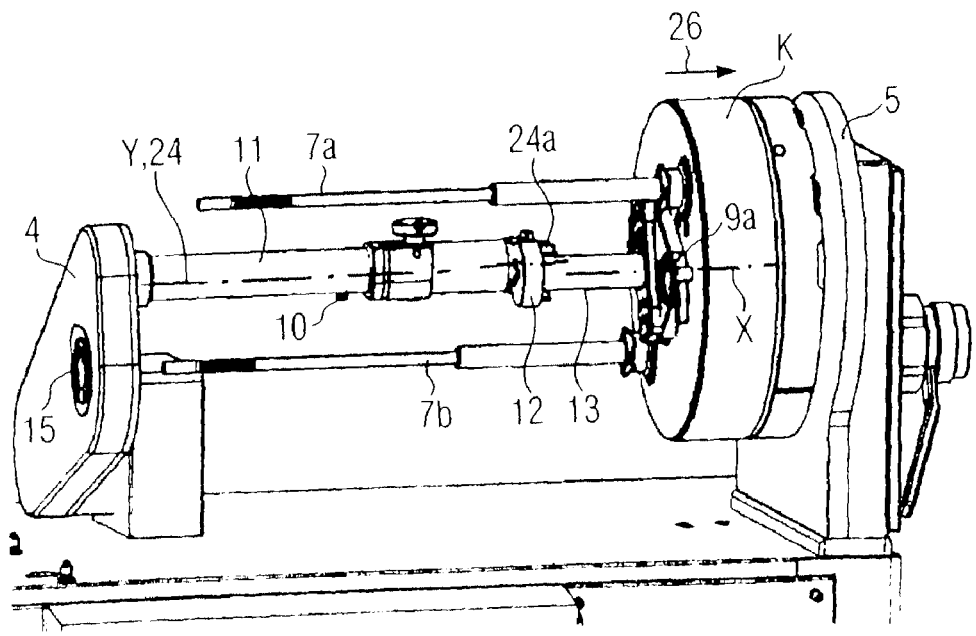
FIG. 2 is a view similar to that of FIG. 1, in a rotary position for selectively
  i. positioning filling tubes provided for filling purposes.
Figure 3:
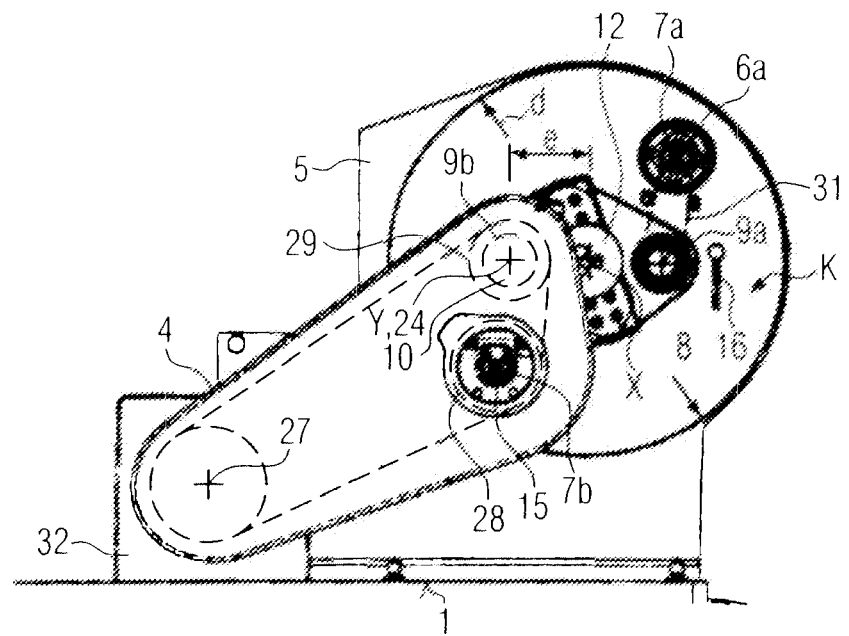
FIG. 3 is an axial view of the device in a viewing direction onto the front end.
Figure 4:
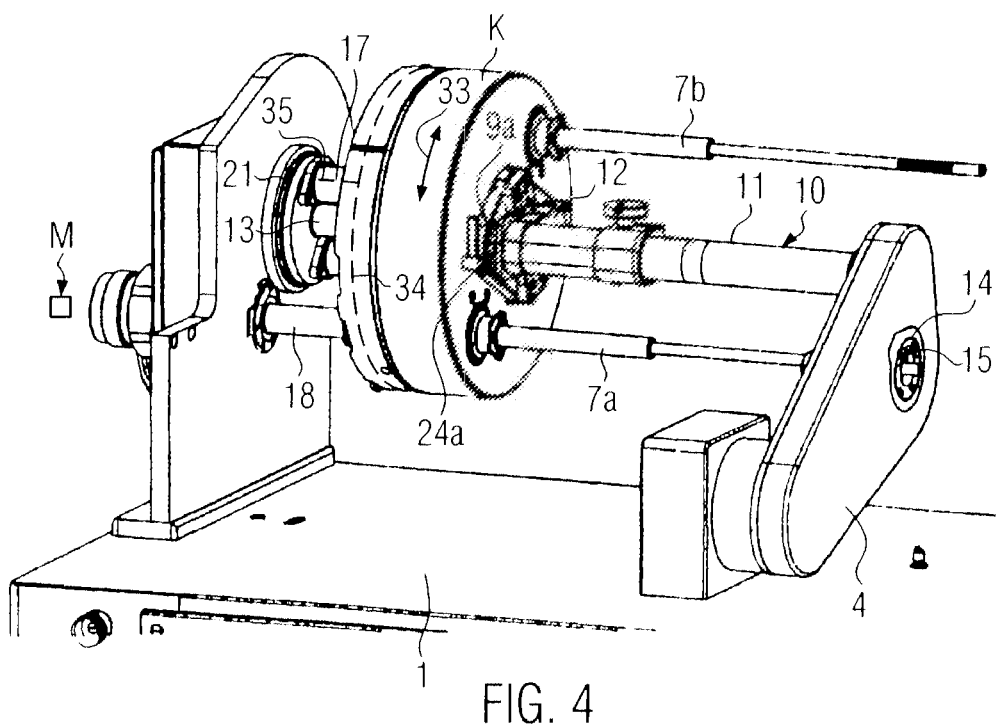
FIG. 4 is a perspective view of the device, in a work position, and in a viewing
  i. direction from the side facing away from the operating side.

At least one tube 17, which is arranged to be laterally offset relative to the twist-off head axis X, expediently two symmetrically arranged tubes 17, which contain shift adjusting means, e.g. screw spindles 35 (FIG. 4), with which the twist-off head K is e.g. displaceable via the servo drive 3b in the direction of the arrows 25 and 26 in FIGS. 1 and 2, extends between the twist-off head K and the support panel 5. The tubes 17 are arranged on a rotary body 21 which is rotatably supported on the support panel 5 and is rotatable e.g. by means of the servo drive 3a in the direction of the double-headed arrow 33 (FIG. 4) with the twist-off head K so as to move e.g. the one filling tube 7a, 7b into the rotary position in conformity with the filling position (FIGS. 1 and 4) in which the free end of the filling tube is aligned with the casing brake 15, and to simultaneously move the other filling tube into the stringing position for changing the casing. With the help of the at least one screw spindle 35 different shift positions of the twist-off head K can be set for a filling operation in response to the respectively chosen filling mode. The twist-off head K is displaceably and rotatably supported on the guide section 13.

At the side of the support panel 5 facing away from the twist-off head K, a supply means 19 with an operating lever 20 is mounted, the supply means being adapted to be coupled with the filling machine M. Furthermore, the support panel 5 and the twist-off head K have arranged thereinbetween an axially shiftable supply tube 18 that via a rotary lead-through which is arranged on the back side of the twist-off head K and extends in a radian measure at least between the two filling tubes 7a, 7b establishes the filling connection with the filling tube 7a, 7b respectively located in the filling position.

Optionally, an adjusting device 22 with an adjusting handle 23, the purpose of which shall be explained later, is arranged on the support section 11.

To rotationally drive, for example, the filling tube 7a, 7b respectively located in the filling position (e.g. for portioning purposes), a drive train A extending along the support axis Y is accommodated in the support section 11 and comprises a drive shaft 24 which is rotationally supported in the support section 11 and which protrudes with an exit end 24a in the area of the crank 12 out of the support section 11 and is adapted to the coupled with the respective rotary coupling 9a, 9b as soon as the twist-off head K is shifted in the direction of arrow 25 in FIG. 1 into the filling position in which the filling tube 7a, 7b has entered with its free end into the casing brake 15. The exit end 24a fits into the respective rotary coupling 9a and 9b, which is e.g. formed as an arc groove coupling.

To permit different shift positions in conformity with the respective filling modes of the device V, the exit end 24a of the drive shaft 24 can be axially adjusted in an optional manner relative to the drive shaft 24, e.g. by means of the adjusting device 22 and the rotary handle 23. For instance, for one filling mode the twist-off head K is shifted relative to the support panel 5 only over 85 mm, for which purpose the exit end 25a has to protrude to a greater extent out of the support section 11, whereas for another filling mode the twist-off head K is shifted over 100 mm, for which purpose the exit end 24 is correspondingly retracted by 15 mm, so that the coupling engagement between the exit end 25a and the rotary coupling 9a and 9b, respectively, is established in a proper way.

In an alternative (not shown), the exit end 24a of the drive shaft 24 could also be resiliently biased in exit direction and pushed back by the twist-off head K according to the shift stroke thereof.

The peripheral contour of the housing 4 has been chosen such that it is slightly retracted relative to the twist-off head axis, and the free end of the filling tube (in FIG. 3) located in the stringing position for changing the casing is freely accessible in an exposed way.

The housing 4 accommodates a power train for driving the casing brake 15 and/or the filling tube 7a, 7b respectively placed in the filling position. An output shaft 27 ends in the housing 4 and is connected via a belt pulley or a gear and a belt drive 30 (e.g. a toothed belt) to corresponding drive gears 28, 29 supported in the housing 4. The drive gear 28 serves to drive the casing brake 15 while the drive gear 29 serves to drive the drive shaft 24 in the support section 11.

The rotary movement of the drive gear 29 is thereby transmitted via the drive shaft 24 to the filling tube 7b (FIG. 3) located in the filling position, so that the exit end 24a (FIG. 4) of the drive shaft 24 engages into the rotary coupling 9b (FIG. 43) which transmits the rotary movement via the drive connection 31 to the rotary bearing 6b of the filling tube and to the filling tube 7b.

Instead of the at least one screw spindle 35 (FIG. 4), a different drive or actuator could also be used. The rotary drive of the twist-off head K could also be designed in a different way and e.g. be operated via the drive train A. Instead of the supply tube 18, a flexible hose could be installed. The filling tubes 7a, 7b are exchangeably mounted on the twist-off head K and can be substituted by other tubes with different filling cross-sections. Likewise, the casing brake 15 could also be substituted by a different casing brake fitting a different filling cross-section. The exit end 24a of the drive shaft 24 is expediently protected by a corresponding seal so as to block the entry of any cleaning agent into the interior of the support section 11 in cleaning cycles. Finally, it would also be conceivable to arrange more than two filling tubes on the twist-off head K.

Figure 5:
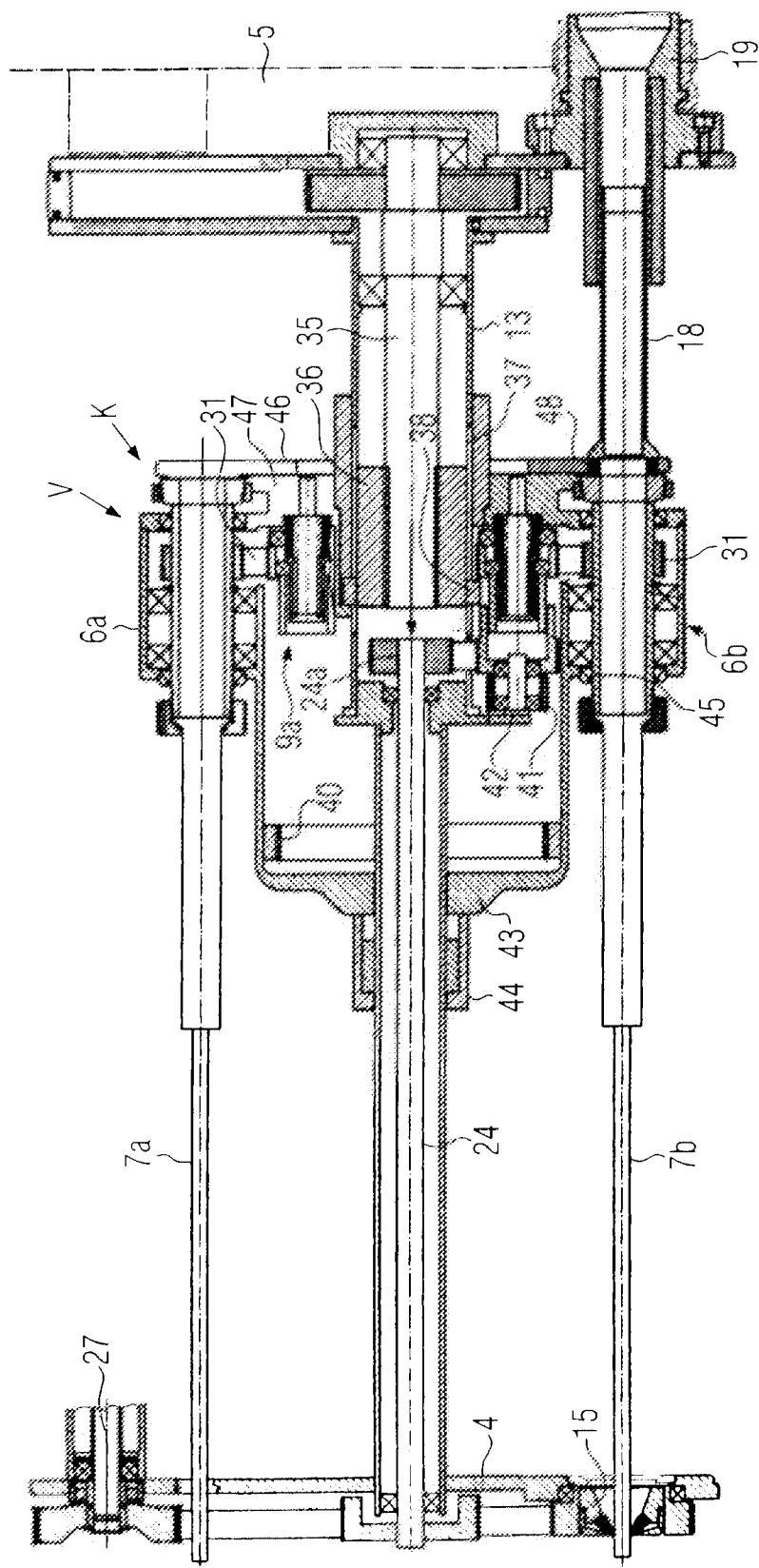
FIGS. 5 and 6 are longitudinal sections of a further embodiment with the twist-off head in
  i. a work position and in a rotary position.
Figure 6:
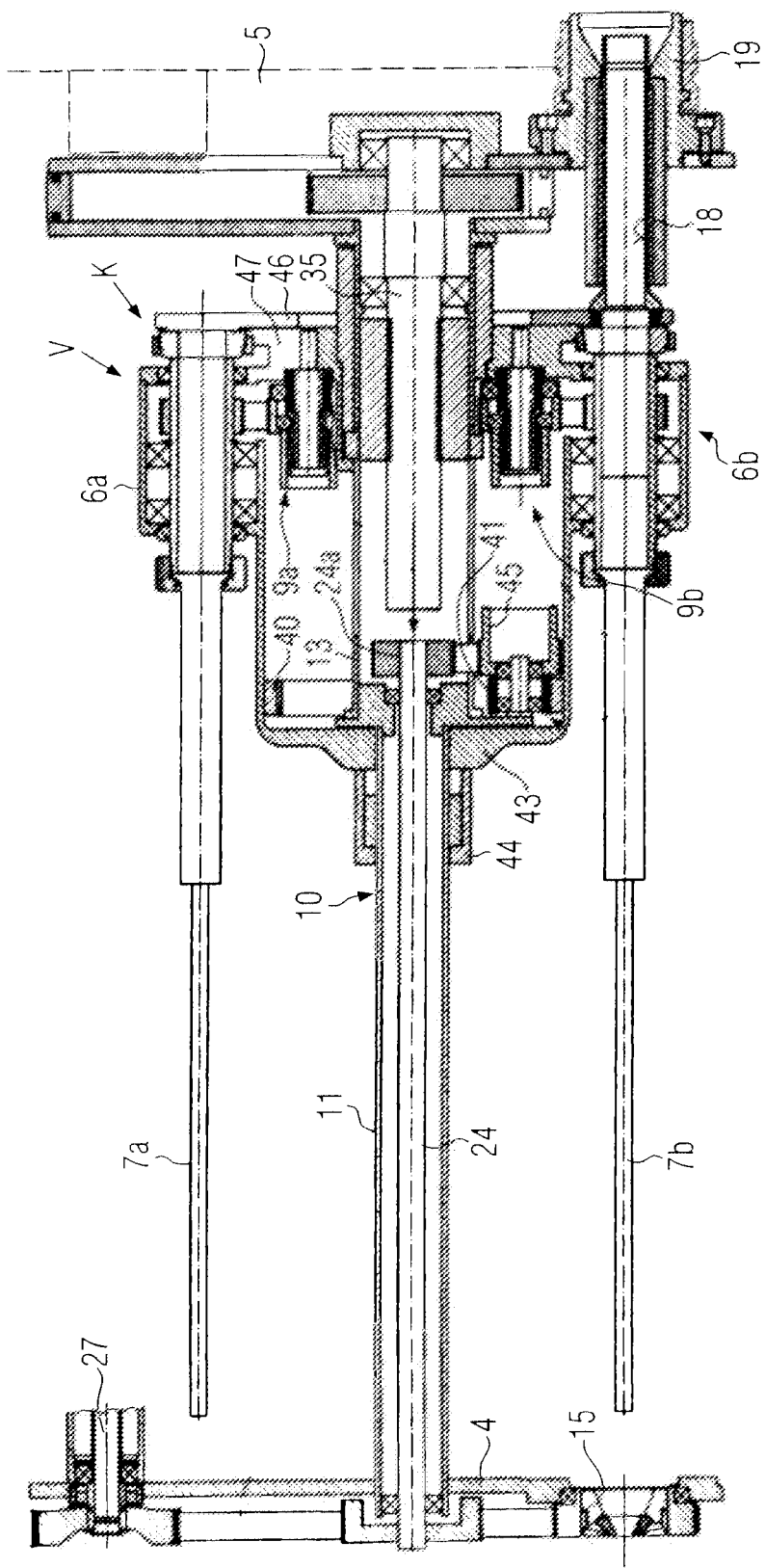

The different embodiment of the device V as shown in FIGS. 5 and 6 (FIG. 5 with twist-off head K shown in a work position; FIG. 6 with twist-off head K shown in a rotary position) differs from the embodiment of FIGS. 1 to 4 inter alia mainly in that the single rigid shaft 10 comprises support and guide sections 11, 14 that are coaxial with one another, and the drive train A extends through the support section 11 up and into the guide section 13 and is selectively used for rotationally driving the filling tube 7a or 7b located in the filling position and for rotating the twist-off head K. Furthermore, the screw spindle 35 is centrally accommodated in the guide section 14 for shifting the twist-off head K e.g. between the work and rotary positions, as shown in FIGS. 5 and 6, on the guide section 13.

The support section 11 and the guide section 13 are hollow round tubes, in the case of which the diameter of the guide section 13 can be greater than the diameter of the support section 11, and are firmly interconnected in the interior of a bell body 43 of the twist-off head K. The exit end 24a of the drive shaft 24 carries a gear which is in drive communication, e.g. via a toothed belt, with a coupling sleeve 45 as part of a further coupling C1 and the coupling C. The coupling sleeve 45 is stationarily positioned at 42 in the guide section 13 and thereby axially aligned with the rotary coupling 9a or 9b of the filling tube 7a or 7b respectively located in the filling position, with the rotary coupling 9a or 9b being there supported in the twist-off head K. In the bell body 43 an inner ring gearing 40 is arranged that is intended for cooperation with an external gearing 41 of the coupling sleeve 45. In the work position of the twist-off head K in FIG. 5, the coupling C1 is disengaged because the bell body 43 is shifted towards the casing brake 15. The coupling C is then engaged between the coupling sleeve 45 and the rotary coupling 9a or 9b so as to be able to drive the filling tube 7a or 7b.

By contrast, in the rotary position of the twist-off head K as shown in FIG. 6, the twist-off head with its bell body 42 is shifted towards the support panel 5 so that the coupling sleeve 45 is disengaged from the rotary coupling 9a or 9b and is in engagement via the external gearing 41 with the internal ring gearing 40 so as to rotate the twist-off head K upon rotation of the drive shaft 24 and to move a filling tube 7a or 7b into the filling position.

The bell body 43 is shifted on the support section 11 and carries a slide seal 44 on the front side. Like in the embodiment of FIGS. 1 to 4, the drive shaft 24 is driven via the input shaft 27 and the belt drive 30 in the housing 4 of the casing brake 15 together with the latter.

In an alternative embodiment, which is not shown in detail, the drive train A (FIG. 5) extends from the side of the support panel 5 through the guide section 13 at least up to the exit end 24a (a gear) so as to rotate the respective filling tube 7a or 7b and selectively the twist-off head K. The drive train A emerging from the side of the support panel 5 could even be guided through the support section 11 up and into the housing 4 so as to drive the casing brake 15 as well. Alternatively, the casing brake 15 could be driven by a separate drive in the housing 4, so that the drive train A ends in the guide section 14 with the exit end 24a and the gear, respectively, in FIGS. 5, 6.

The shift movement of the twist-off head K is effected in FIGS. 5 and 6 by the screw spindle 35, which is here accommodated in the interior of the guide section 13. The screw spindle is driven by a servo drive (not marked in more detail) via a gear 39 at the side of the support panel 5 and carries a nut 36 adapted to be screwed onto the screw spindle 35 and engages with extensions 38 into longitudinal slots 37 of the guide section 13 in a longitudinally shiftable, but non-rotatable, manner. The extensions 38 act as catches in a support body 47 of the twist-off head. The rotary bearings 6a, 6b of the filling tubes are supported on the support body 37, and the bell body 43 is also supported on said bearings.

On the back side of the support body 47 a circular rotary lead-through 46 is rotatably arranged relative to the support body 47, the lead-through comprising a passage 48 into which the supply tube 18 is inserted, which supply tube is held in the supply means 19 in an axially displaceable way and establishes the filling connection from the supply means 19 to the filling tube 7a or 7b located in the filling position. The supply tube 18 follows shift movements of the twist-off head K.

The invention claimed is:

1. A device (V) for filling casings, comprising a twist-off head (K) which includes at least two circumferentially offset filling tubes and which is connectable to at least one supply means and is arranged to be shiftable and rotatable about an axis (X) on a support panel, a stationary casing brake axially aligned with a filling tube located in a filling position, at least the filling tube located in the filling position is rotatably drivable in the twist-off head (K), the casing brake and the support panel are connected via a single rigid shaft comprising a support section extending towards the casing brake and a guide section extending in the twist-off head axis (X) centrally through the twist-off head (K), and that a drive train (A) is arranged in the shaft.

2. The device according to claim 1, wherein the drive train (A) in the shaft is drivable either from the side of the casing brake or from the side of the support panel or from both sides.

3. The device according to claim 1, wherein the support section and the guide section are coaxial.

4. The device according to claim 3 wherein a power train is provided in, on or at a housing which contains the casing brake and is connected to the support section, that at least the support section of the shaft is made hollow, and that the drive train (A), which can be operated by the power train, extends in the support section towards the twist-off head (K) and is there coupled or adapted to be coupled at least with the filling tube located in the filling position, the casing brake being preferably rotatably drivable in the stationary housing also by the power train.

5. The device according to claim 4, wherein the power train in the housing comprises an output shaft which is coupled or adapted to be coupled via a belt drive with the casing brake and the drive train in the support section of the shaft.

6. The device according to claim 4, wherein the housing and the support panel are stationarily arranged on a base.

7. The device according to claim 1, wherein the shaft between the support section and the guide section comprises a crank, the support section being offset relative to the guide section substantially towards the casing brake.

8. The device according to claim 7, wherein the support section and the guide section are in parallel with each other, and that the support section is offset relative to the guide section within the movement paths of the filling tubes upon rotation of the twist-off head (K) and by a dimension (e) that is about 15% to 25% the outer diameter (d) of the twist-off head (K).

9. The device according to claim 1, wherein the drive train (A) leading to the filling tube comprises a coupling (C) which can be engaged and disengaged by shifting the twist-off head (K) and which is arranged one of in the twist-off head (K) or between the twist-off head (K) and the support section.

10. The device according to claim 9, wherein the drive train (A) comprises a drive shaft which is supported in the support section and which on the crank exits with an exit end out of the support section and which is adapted to be aligned by rotating the twist-off head (K) with the exit end relative to at least one rotary coupling which is arranged in the twist-off head (K) and connected to at least one filling-tube rotary bearing in the twist-off head (K).

11. The device according to claim 10, wherein the exit end of the drive shaft is axially adjustable on the drive shaft and fixable in different shift positions in the support section.

12. The device according to claim 11, wherein the exit end of the drive shaft is axially adjustable by means of an adjusting device which is arranged on the support section and comprises an adjusting handle.

13. The device according to claim 9, wherein the coupling (C) is provided between the exit end of the drive shaft, which is relatively displaceable in the twist-off head (K), and the respective filling-tube rotary bearing arranged in the twist-off head (K).

14. The device according to claim 9, wherein the at least one rotary coupling is an arc groove coupling.

15. The device according to claim 1, wherein the twist-off head (K) is shiftable by means of a servo drive in axially parallel fashion on the guide section.

16. The device according to claim 15, wherein the twist-off head is shiftable by means of a servo drive via at least one screw spindle.

17. The device according to claim 16, wherein the screw spindle is offset relative to the guide section between the support panel and the twist-off head (K) and rotatably arranged with the twist-off head (K) around the guide section.

18. The device according to claim 16, wherein the screw spindle is centrally arranged inside the guide section.

19. The device according to claim 1, wherein the twist-off head (K) is rotatable by means of the drive train (A) in the shaft around the guide section via a coupling (C1) which can be engaged and disengaged by shifting the twist-off head (K) between a work position and a rotary position on the guide section and is arranged in the twist-off head (K).

20. The device according to claim 1, wherein the support panel and the twist-off head (K) have provided thereinbetween a supply tube which is connected to the supply means and is in parallel with the twist-off head axis (X) and is shiftable in the support panel and which via a rotary lead-through, which is rotatable with the twist-off head (K), is connectable to the filling tube located in one of the filling position or the filling-tube rotary bearing thereof.

* * * * *